July 24, 1962  D. C. RUPERT  3,045,851
OUTBOARD MOTOR LIFT CART
Filed Dec. 28, 1956  2 Sheets-Sheet 1

INVENTOR.
DELBERT C. RUPERT
BY
Reynolds, Beach & Christensen
ATTORNEYS

July 24, 1962
D. C. RUPERT
3,045,851
OUTBOARD MOTOR LIFT CART
Filed Dec. 28, 1956
2 Sheets-Sheet 2
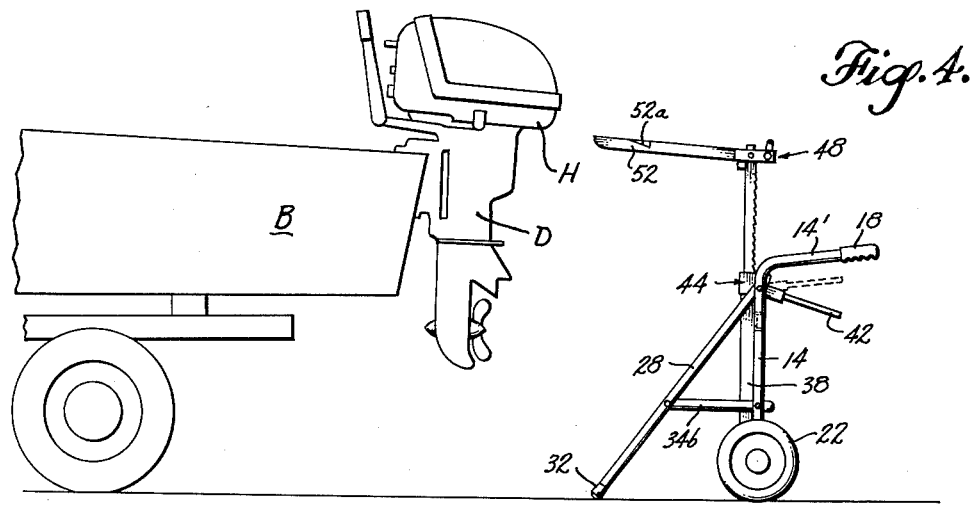
Fig. 4.
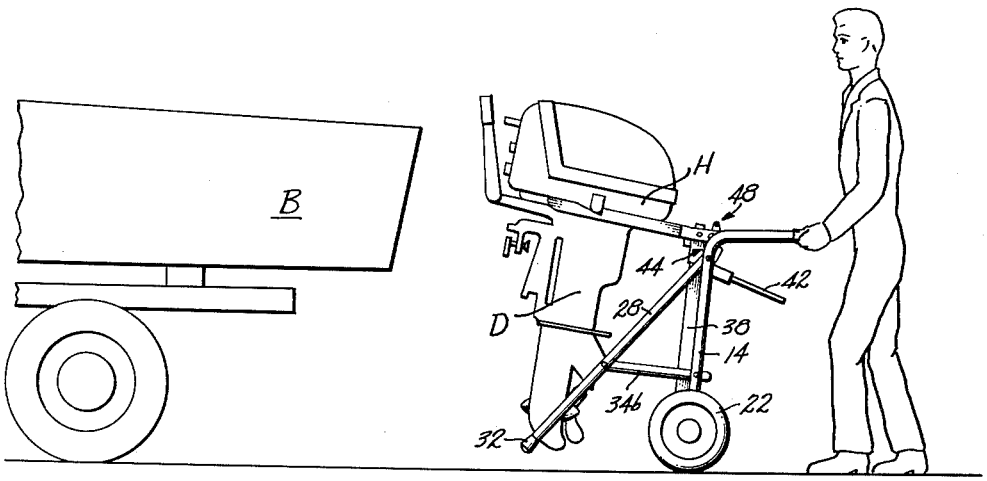
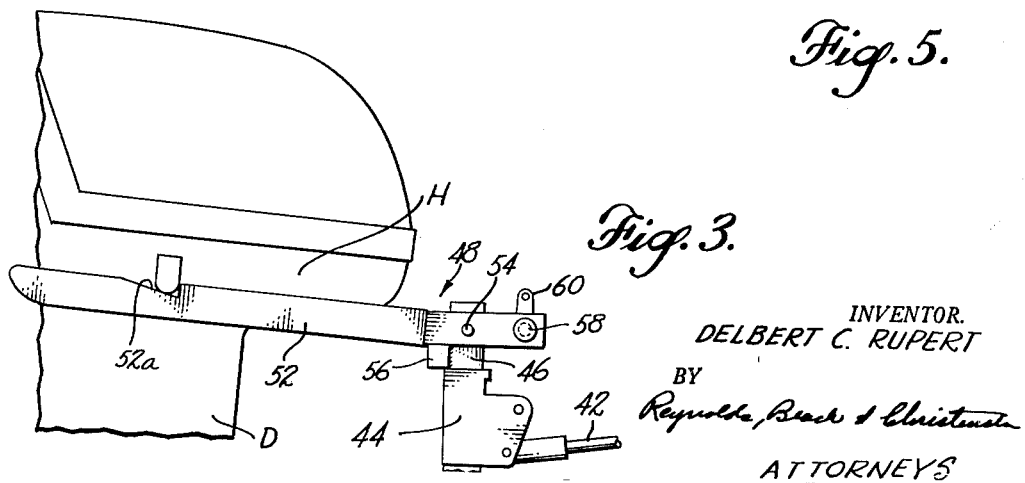
Fig. 5.
Fig. 3.
INVENTOR.
DELBERT C. RUPERT
BY
Reynolds, Beach & Christensen
ATTORNEYS United States Patent Office 3,045,851
Patented July 24, 1962

3,045,851
OUTBOARD MOTOR LIFT CART
Delbert C. Rupert, 6839 31st NE., Seattle, Wash.
Filed Dec. 28, 1956, Ser. No. 631,122
2 Claims. (Cl. 214—653)

This invention relates to a novel device for handling, transporting, and storing outboard motors, and is herein illustratively described by reference to the presently preferred form thereof. However, it will be recognized that certain modifications and changes therein with respect to details may be made without departing from the essential features involved.

Various carts have been devised and are in use for storing outboard motors and for moving them from place to place manually. These carts have a bracket on which the mounting clamp of the motor is secured in order to support the motor in generally the same attitude and manner as it is on a boat transom. The principle of a storage cart for outboard motors is a sound one, particularly for large and heavy motors which are very cumbersome to carry. Moreover, such carts hold the motor in upright position so as to insure proper drainage of water from the cooling system. Such carts permit one individual to move even the largest motors from place to place.

The limitation of any cart of the former type referred to above, however, is that popular size motors are now so large and heavy that it usually takes two men to lift one without great effort so as to place it upon a boat transom or other support, or to remove it therefrom for placement on the cart. Such a procedure is particularly awkward in the case of mounting and demounting the motor on a trailer-supported boat, because of the considerable height of the transom above ground. The difficulty of shifting these motors between the cart and the boat transom or other mount, therefore, tends to defeat the purpose and value of a storage and transport cart of the former type, which was intended to permit one person to handle the motor alone.

An object of the present invention is to provide an outboard motor storage cart which will enable one individual to install, remove and transport even the largest of motors with ease and safety. Another object is to provide a practicable and efficient cart of this type on which the motor may be stored and moved about stably, and by which it may be installed on a boat transom or other support and removed therefrom with a minimum of effort by use of a mechanical lifting device. Compactness, ruggedness and simplicity of construction, as well as minimum cost and versatility to accommodate motors of different sizes and makes are additional objectives. A more specific object is the provision in such a cart of lift means adapted to be brought readily and quickly into lifting engagement with an outboard motor on a boat transom or other support and to be as readily and quickly disengaged from an outboard motor deposited thereby on a boat transom or other support, and in the interim to support the motor securely and stably for conveyance by the cart or for storage on the cart. A related object is to provide such a lift means which may be adjusted to accommodate motors of different types and makes as mentioned above.

With these and other objects in view, the various features of the invention will become evident from the following description of the preferred construction of the cart as illustrated in the accompanying drawings.

FIGURE 3 is an enlarged side view of the lift head engaging a motor.

FIGURES 4 and 5 are operational side views showing use of the cart to install and remove an outboard motor on and from a trailer boat.

Figure 1:
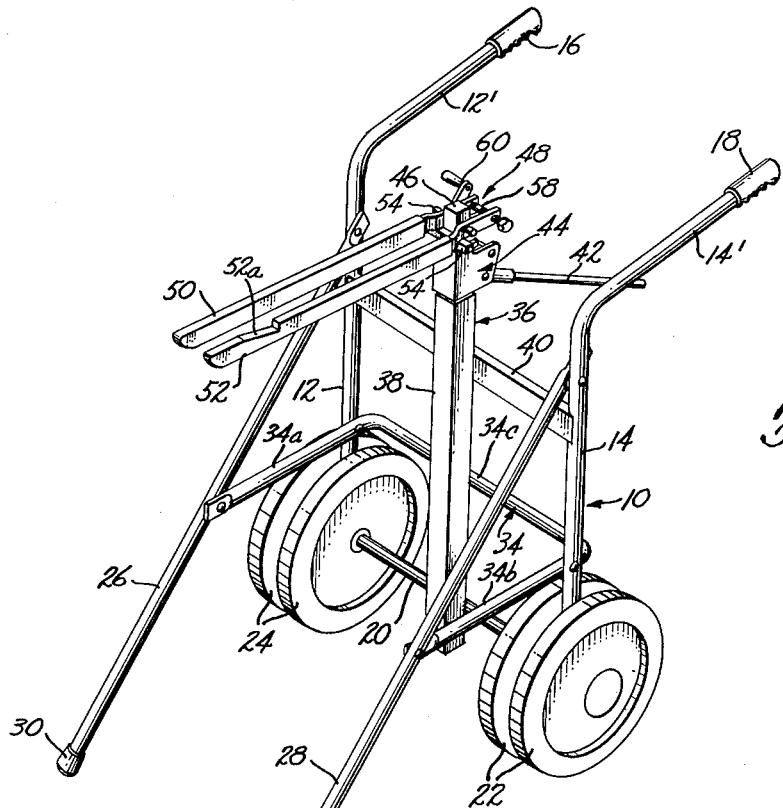
FIGURE 1 is a front perspective view of the novel cart.

Referring to the drawings, the improved cart in its illustrated form comprises a frame generally designated 10. Upright tubular steel posts 12 and 14 on respectively opposite sides of the frame at the rear are turned rearwardly near their upper ends to provide handle bars 12' and 14', respectively, which carry hand grips 16 and 18. The lower ends of these posts have transverse apertures (not shown) to accommodate the transversely extending axle 20. Ground-engaging wheels are journaled on axle 20 at transversely spaced locations, and in the example, two pairs of wheels are provided on each side of the cart. The wheels 22 are located on respectively opposite sides of post 14 and the wheels 24 on respectively opposite sides of the post 12. Forwardly and downwardly inclined tubular steel side members 26, 28 are secured by their upper ends to the respective posts 12 and 14 near the upper ends of the latter. The lower ends of the inclined base members 26 and 28 serve as ground-engaging elements and are preferably provided with rubber tips or shoes 30 and 32, respectively, for that purpose. A forwardly open U-shaped tubular steel brace 34 disposed in a generally horizontal plane interconnects the posts 12 and 14 and the inclined members 26 and 28 to complete a rigid frame structure open on its forward side. The parallel legs 34a and 34b of the brace 34 are connected at their projecting forward ends to generally intermediate points on the respective supports 26 and 28, and at their base ends to the respective posts 12 and 14. Thus the transverse or connecting member 34c of brace 34 maintains rigid spacing between the posts 12 and 14. Such a frame structure in itself, though of the presently preferred type for use as an element of the combination cart, is but one of various suitable types in connection with which the invention may be applied, and the specific details thereof are not separately claimed herein nor essential to the practice of the present invention in broad aspects.

The ground-engaging wheels and the ground-engaging members 26 and 28 maintain the cart frame 10 in generally upright position, although as will be readily obvious the weight may be shifted by downward pressure on the handles 16 and 18 in order to lift the members 26 and 28 off the ground for moving the cart about on the wheels in the usual manner.

On the upright frame 10 is mounted a lifting jack, generally designated 36. While this jack may be of any suitable or conventional type, it is shown as a mechanical type of jack, having an elongated tubular body 36 of square cross section which is rigidly secured by its lower end to the central portion of the axle 20 and near its upper end to the cross brace 40 connected in the frame between posts 12 and 14 for purposes of mounting the jack. The rearwardly extending jack handle or operating lever 42 is connected to the operating mechanism of the jack generally designated 44, but not shown in detail herein. The jack includes an extensible bar 46 which slides in the rectangular tubular member 38 to be raised and lowered in relation thereto by operation of the lever 42 in the usual manner.

The upper end of the extension bar 46 of the jack carries a special lift head, generally designated 48, comprising a pair of generally horizontal forwardly projecting lift arms 50 and 52 secured near their rear end portions by a transverse pin 54 to the upper end of the extension bar 46 and on respectively opposite sides thereof. Preferably, these elongated lift arms are of rectangular cross section with the long cross-sectional dimension thereof extending vertically. A stop or rest 56 welded or otherwise secured to the front side of the extension bar 46 of the jack prevents downward tilting of the forward ends of the arms 50 and 52 (FIGURE 3). In fact for purposes of holding a motor on the lift bars against any possibility of sliding off the ends thereof accidentally, it is preferred that these lift bars be tilted upwardly from rear to front by a small angle such as 5° or thereabouts. For purposes of adjustability of the spacing between the lift arms 50 and 52 to accommodate motors of different sizes or makes, they are transversely slidable on the pin 54 and are free to slide on the upper face of the rest 56. The rear ends of the arms 50 and 52 project rearwardly past the jack bar 46 and are apertured and threaded to receive an adjusting screw 58 whose opposite end portions have threads of opposite hand engaging the respective arms. A crank arm and handle combination 60 on the end of the adjusting screw 58 permits turning the screw conveniently for varying the spacing between the arms 50 and 52.

Figure 2:
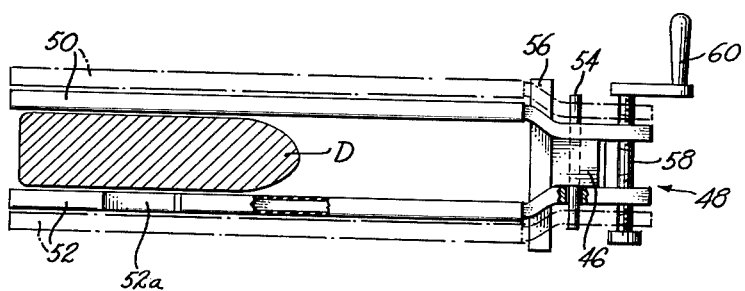
FIGURE 2 is a top view at larger scale, showing the lift head and its mode of operation.

Referring to FIGURES 2, 3, 4, and 5, outboard motors of conventional design are provided with a power head H and, depending therefrom, a propeller drive assembly including a housing D, the upper end of which, where it joins the power head, is shown generally in cross-sectional outline in FIGURE 2 for one popular make of motor. The lower side of the power head H on respectively opposite sides of the propeller drive assembly housing D in the popular make motors is generally flat in most cases and relatively unencumbered by downwardly projecting elements or protuberances. The lift cart representing the present invention in its preferred form shown in the drawings is devised to engage such an outboard motor for lifting purposes by elements placed to bear upwardly against the lower side of the power head H on respectively opposite sides of the propeller drive assembly housing D. Thus, in the illustration the elongated generally parallel lift arms 50 and 52 are brought into position for engaging and lifting the motor on the transom of the trailer boat B by forward movement of the cart approaching the motor from the rear where it is most readily accessible from the ground. As the cart advances, the lift arms 50 and 52, properly elevated by the cart jack, move into position along opposite sides of the upper end of the housing D, to the relative position shown in FIGURES 3 and 5. If desired, the ends of the lift arms may be designed to advance into contact with elements on the motor to limit forward relative advance of the cart, so as to establish the final relative position of the arms in relation to the motor. Otherwise the operator may use his own judgment to determine correct placement of the arms. Thereupon operation of the jack lever 42 causes the arms 50 and 52 to lift the motor from the boat transom. During this lifting operation the cart is, of course, stably positioned beneath the motor with the center af gravity of the motor generally centered in relation to the cart's ground-engaging elements for purposes of stability. To that end, the transverse spacing between the sets of wheels 22 and 24 and between the ground-engaging elements 26 and 28 is made sufficient for transverse stability whereas the front to rear spacing between the wheels and the lower ends of the elements 26 and 28 is made sufficient for stability against tipping in the fore and aft sense. The front side of the frame 10 is of open construction so as to accommodate the motor generally centrally therein. With the motor lifted from the boat by operation of the pack, the cart may be backed away from the boat slightly and the jack operated in the reverse sense to lower the motor as close to the ground as possible for minimizing any tipping tendency and thereby the effort required to steady the cart during movement thereof. The entire operation may be performed readily and quickly by one individual without strain inasmuch as the jack provides the necessary lift force and enables the motor once lifted from the boat transom to be lowered to the point where the loaded cart is as stable as possible.

As illustrated, one of the lift arms, namely, the arm 52 has a notch 52a therein which is provided to accommodate a fitting on the particular make of motor for which the illustrative cart was designed. In this connection, it will be recognized that the specific form of the lift arms or other elements engaging the motor at the general location and generally in the manner referred to, namely, at the base of the power head H adjacent opposite surfaces of the housing D, may vary somewhat in the detail form either to suit particular makes or types of motors, or in accordance with design preference. The simple substantially straight lift arm of rectangular cross section as shown is preferred for most makes, however, with minor necessary irregularities therein to accomodate motor fittings, if necessary.

Figure 6:
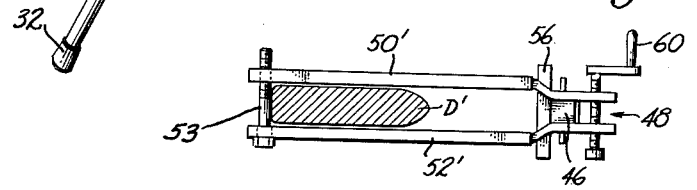
FIGURE 6 is a top view of a lift head of modified construction.

The feature of adjustability of lateral spacing between the lift arms 50 and 52 provides for accommodation of the currently leading or major makes of outboard motors and for different sizes thereof. These motors are generally similar in construction as to form and arrangement of the power head H and the propeller drive assembly housing D so as to be engageable by substantially straight lift arms in the form shown, but the transverse width of the housing D just below the power head varies somewhat. Simply turning the adjusting screw crank 60 one way or the other to accommodate the particular motor is the only cart adjustment necessary or these different motors. If desired the lift arms may be used as clamp members which are brought against opposite sides of the housing D with sufficient pressure by turning the screw crank 60 or other actuating means to grip and frictionally hold the motor therebetween without necessity of bearing upwardly against power head H. Such an arrangement is adaptable to various makes and sizes of motors although conformation curvature of the inside faces of the arms for that mode of use may be preferred when they are to be used as clamp type holding elements. Downward taper in the width or thickness of the housing D of most motors insures that the motor will not slip down between the arms. In FIGURE 6 the lift arms 50' and 52' are provided with apertures in their projecting ends through which a clamp bolt 53 may be passed. By tightening the bolt 53, the end of which is threaded into one of the arm apertures the arms are drawn together to clamp the housing D therebetween. Also the bolt serves as a retainer preventing any possible dislodgement of the motor from supported position thereon by sliding off the ends of such arms. The illustrated arm or lift fitting configuration provides not only stability against tipping of the motor in a fore and aft sense, but, because of the vertical width of the lift arms bearing against opposite sides of the housing D, and their rigidly maintained spacing, provides lateral tipping stability also. Considerable inherent stability of the motor supported on the arms is of course derived from the close proximity of the arms to the motor's center of gravity. Furthermore, lift fittings of the simple configuration shown are more readily engageable and disengageable in relation to a motor, as by direct fore and aft approach movement and withdrawal movement of the lift cart than would be more complex fittings.

If desired rubber sheathing or contact facings may be provided on the lift arms to prevent abrasion of painted motor surfaces thereby.

It will be evident that the novel lift cart not only permits installing and removing motors in relation to the transoms of boats, but of accomplishing this result in connection with other similar supports such as stationary storage racks for outboard motors, used in repair shops and the like, and regardless of the height of the support within wide limits. The novel cart is extremely versatile and of simple and compact construction. It provides a stable storage rack for motors, a convenient means for moving motors from one support to another, and enables the entire operation of moving or installing a motor to be performed by one individual, thereby reducing the cost of operating maintenance and repair services, and enabling the owner of such motors to handle his own equipment with a minimum of effort.

I claim as my invention:

1. An outboard motor lift cart for lifting, moving and storing of outboard motors of the type comprising an upper portion including a power head, a propeller drive assembly housing depending therefrom, and forward clamp means by which the motor is mounted in upright position on a boat transom or other support, said cart comprising a generally upright frame including upright post members at the rear corners of the frame, ground-engaging wheels mounted on the frame generally at the rear lower side corners thereof, forwardly and downwardly extending opposite side members having upper portions connected to the respective post members and having lower portions comprising ground-engaging means to stabilize the cart in generally upright position, forwardly opening U-shaped brace means generally horizontally disposed and interconnecting said post members and side members at a relatively low position on said frame, and transverse brace means interconnecting said post members materially above said first brace means, jack means comprising a generally upright elongated body member rigidly connected to both of said brace means substantially transversely mid-way between said post members, and motor engaging means carried by the upper end of said jack means at a location generally intermediate the front and rear and respectively opposite sides of the cart, comprising a pair of transversely spaced cantilever arms projecting forwardly from said jack means and adapted by forward approach movement of said cart from the rear of the motor to engage the motor generally at the corner locations defined by the opposite sides of its propeller drive assembly and the bottom of its power head, thereby to permit lifting the motor from its support by operation of said jack means and to carry the motor stably in upright position, said cart further including handle means at an elevated position on the frame.

2. An outboard motor lift cart for lifting, moving and storing of outboard motors of the type comprising an upper portion including a power head, a propeller drive assembly housing depending therefrom, and forward clamp means by which the motor is mounted in upright position on a boat transom or other support, said cart comprising a generally upright frame including upper and lower transversely extending members at the rear of the frame, upper and lower sets of side members, members of the lower set extending forwardly generally horizontally from the respective locations of opposite ends of the lower transversely extending member, and members of the upper set extending forwardly and downwardly from the respective locations of opposite ends of the upper transversely extending member to connect with the respective members of the lower set, one of said sets and the associated transverse member being integrally joined in a forwardly open rigid U-shaped brace means, ground-engaging wheels mounted on the frame generally at the rear lower side corners thereof, ground-engaging means mounted on the frame at the front lower side corners of the frame to stabilize the cart in generally upright position, jack means comprising a generally upright elongated body member rigidly connected to both of said transversely extending members substantially midway between the ends thereof, and motor engaging means carried by the upper end of said jack means at a location generally intermediate the front and rear and respectively opposite sides of the cart, comprising a pair of transversely spaced cantilever arms projecting forwardly from said jack means and adapted by forward approach movement of said cart from the rear of the motor to engage the motor generally at the corner locations defined by the opposite sides of its propeller drive assembly and the bottom of its power head, thereby to permit lifting the motor from its support by operation of said jack means and to carry the motor stably in upright position, said cart further including handle means at an elevated position on the frame.

References Cited in the file of this patent

UNITED STATES PATENTS

| | | |
|---|---|---|
| 265,465 | Thompson | Oct. 3, 1882 |
| 1,018,260 | Myrholm | Feb. 20, 1912 |
| 1,518,561 | Carroll | Dec. 9, 1924 |
| 2,358,801 | Gerdes | Sept. 26, 1944 |
| 2,507,234 | Vickery | May 9, 1950 |
| 2,711,152 | McGregor | June 21, 1955 |
| 2,723,863 | Mattio | Nov. 15, 1955 |
| 2,794,564 | Frieburger | June 4, 1957 |

FOREIGN PATENTS

| | | |
|---|---|---|
| 734,543 | Great Britain | Mar. 11, 1954 |